Jan. 27, 1959 H. C. WINKEL 2,870,921
CELL QUANTITY SELECTOR FOR BATTERY PLATES
Filed Nov. 30, 1953 9 Sheets-Sheet 2
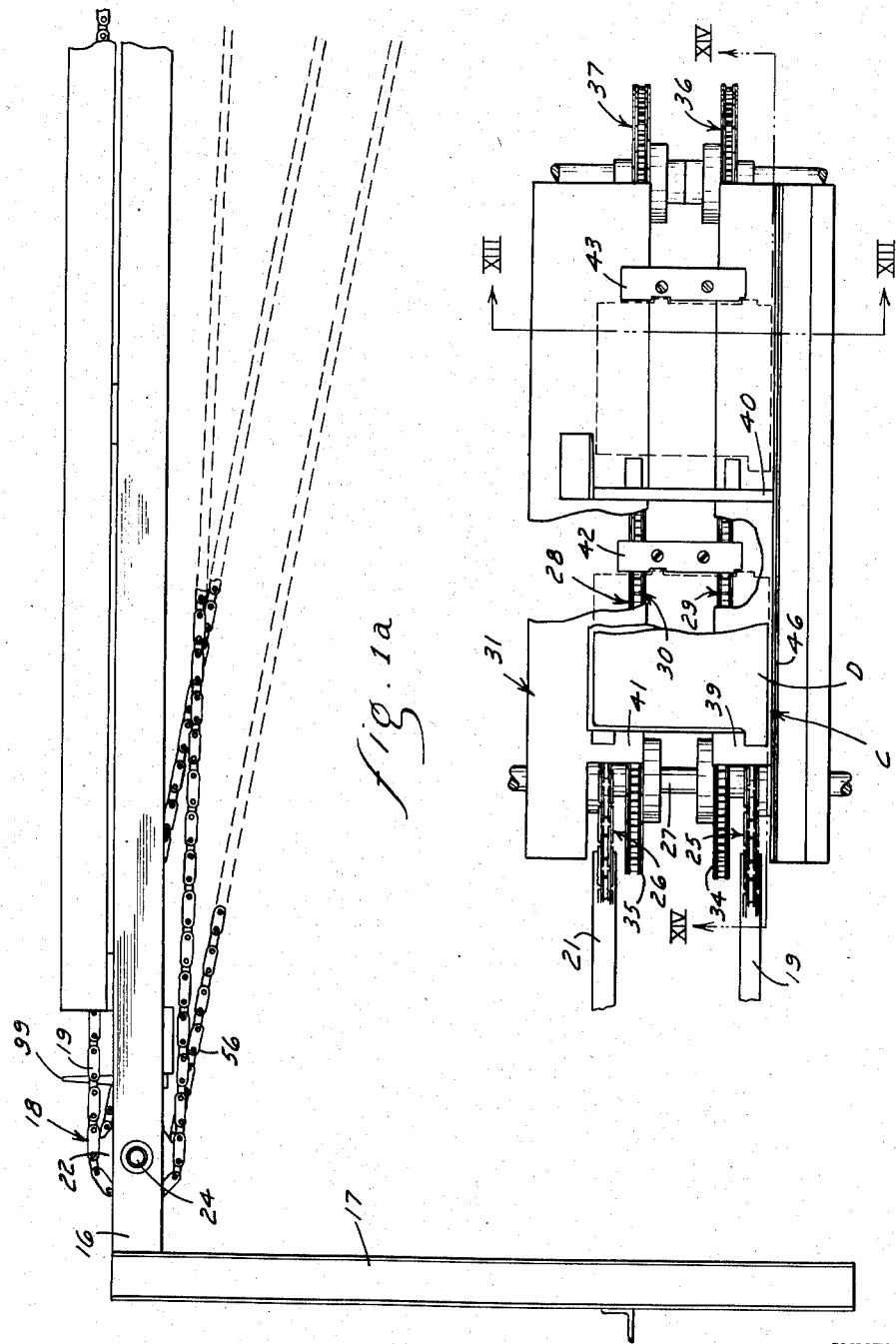
INVENTOR.
HERBERT C. WINKEL
BY
Robert E. Woodhams
ATTORNEY Jan. 27, 1959 H. C. WINKEL 2,870,921
CELL QUANTITY SELECTOR FOR BATTERY PLATES
Filed Nov. 30, 1953 9 Sheets-Sheet 3

INVENTOR.
HERBERT C. WINKEL
BY
ATTORNEY

Jan. 27, 1959           H. C. WINKEL           2,870,921
CELL QUANTITY SELECTOR FOR BATTERY PLATES
Filed Nov. 30, 1953           9 Sheets-Sheet 4
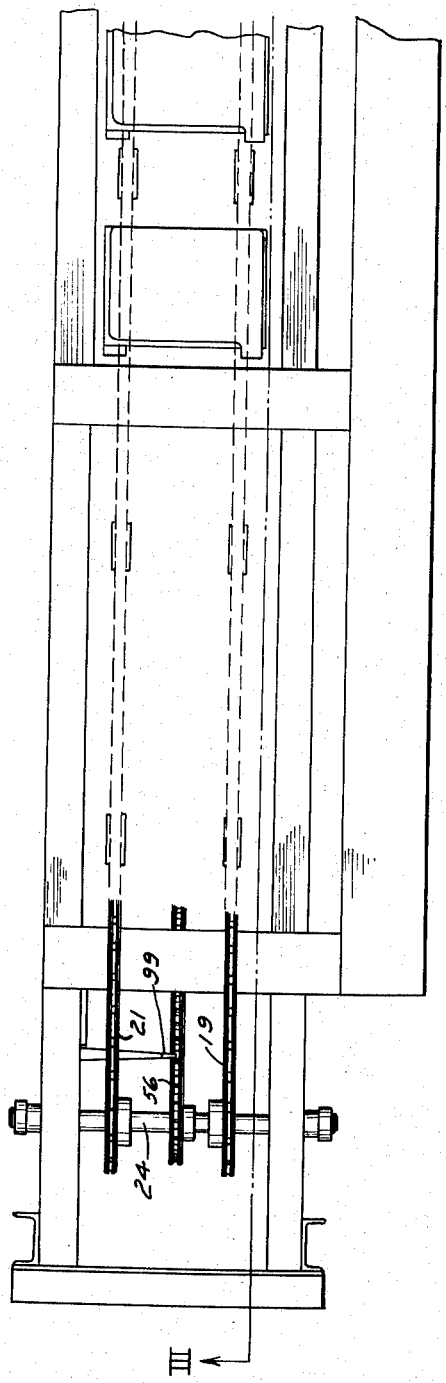
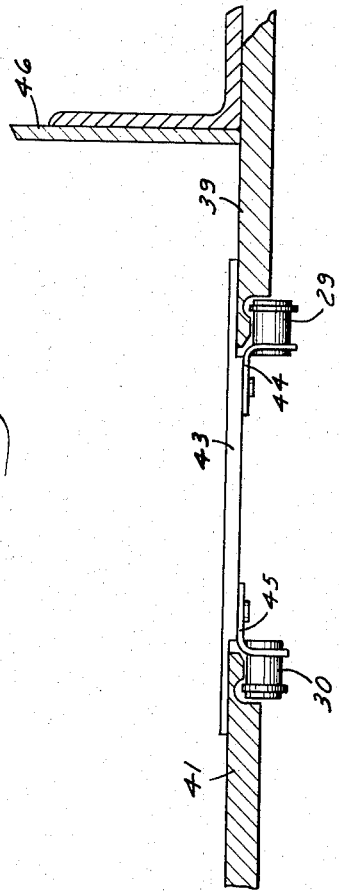
INVENTOR.
HERBERT C. WINKEL
BY
ATTORNEY Jan. 27, 1959     H. C. WINKEL     2,870,921
CELL QUANTITY SELECTOR FOR BATTERY PLATES
Filed Nov. 30, 1953     9 Sheets-Sheet 5

INVENTOR.
HERBERT C. WINKEL
BY
ATTORNEY

Jan. 27, 1959  H. C. WINKEL  2,870,921
CELL QUANTITY SELECTOR FOR BATTERY PLATES
Filed Nov. 30, 1953  9 Sheets-Sheet 7

INVENTOR.
HERBERT C. WINKEL
BY
Robert E. Woodhouse
ATTORNEY

Jan. 27, 1959 H. C. WINKEL 2,870,921
CELL QUANTITY SELECTOR FOR BATTERY PLATES
Filed Nov. 30, 1953 9 Sheets-Sheet 8

INVENTOR.
HERBERT C. WINKEL
BY
Robert E. Woodham
ATTORNEY

Jan. 27, 1959 H. C. WINKEL 2,870,921
CELL QUANTITY SELECTOR FOR BATTERY PLATES
Filed Nov. 30, 1953

INVENTOR.
HERBERT C. WINKEL
BY
Robert E. Woodhams
ATTORNEY

United States Patent Office 2,870,921
Patented Jan. 27, 1959

2,870,921
CELL QUANTITY SELECTOR FOR BATTERY PLATES

Herbert C. Winkel, Watervliet, Mich.

Application November 30, 1953, Serial No. 395,202

5 Claims. (Cl. 214—6)

This invention relates in general to a machine for receiving one or more substantially rigid sheets, assembling said sheets into stacks, each stack comprising a preselected number of said sheets, and delivering said stacks to a point of further handling. More particularly, the invention relates to a machine adapted to the reception and assembly of battery plates and separators into stacked groups.

The assembling of storage battery components, that is, the plates and separators constituting the components of a single cell, is presently customarily carried out by hand. A single workman will place in front of him suitable stacks of negative plates, of positive plates and of separators and will manually remove selected components from these stacks in a predetermined order and number and arrange them into a single stacked group constituting the components of a single battery cell.

Inasmuch as this can be carried out quite rapidly, it is acceptable for relatively small operations, particularly operations involving varying sizes and types of cell groups. However, for operations that are larger, wherein large numbers of a single type of battery are being made, such use of hand labor becomes undesirably expensive.

To meet this difficulty, certain machines have been suggested for taking plates and separators from suitable stacks and arranging them into a single basic unit, consisting of one negative plate, one separator, one positive plate and one separator, commonly termed in the industry a "cell unit." However, the problem still remains of assembling a plurality of these cell units to form one "cell group" of a battery.

Accordingly, it becomes desirable, if the advantage of machine operation is to be maintained, to provide a machine cooperable with the machine assembling cell units for further assembling a plurality of such cell units into cell groups.

Further, since each cell group normally has a negative plate at each of its ends, it is necessary to add one negative plate to each plurality of cell units. For example, in a cell group having thirteen plates, there will be seven negative plates, six positive plates and twelve separators, which are assembled alternately starting with a negative plate and ending with a negative plate. Thus, an acceptable machine for assembling cell units into cell groups must have provision for adding such extra negative plate to each cell group.

The production of a single plant will normally include batteries having any different numbers of plates therein even though the same cell unit will be utilized in all of such different batteries. It is necessary that the machine provided for arranging the cell units into such cell groups be flexible and capable of easy adjustment from the production of cell groups having one number of cell units therein to the production of cell groups having a different number of cell units therein.

Accordingly, a principal object of the invention is to provide an automatic device for receiving a successively delivered plurality of cell battery units and assembling them into a cell group of predetermined size.

A further object of the invention is to provide a device, as aforesaid, which can be readily adjusted to form cell groups of a plurality of different sizes without affecting the rate at which the cell units can be successively received.

A further object of the invention is to provide a device, as aforesaid, which can receive said cell units in a continuous and steady stream.

A further object of the invention is to provide a device, as aforesaid, which will operate successively under any circumstances where cell units are assembled, including by hand, and supplied to a continuously moving conveyor belt, with which said machine may cooperate.

A further object of the invention is to provide a device, as aforesaid, which is readily adaptable to battery plates and separators of a variety of different sizes.

A further object of the invention is to provide a device, as aforesaid, which will apply to the cell group the additional plate needed to secure the presence of a negative plate at each end of the assembled group.

A further object of the invention is to provide a device, as aforesaid, which will be accurate in its handling of the battery components involved in the assembly of said cell groups.

A further object of the invention is to provide a device, as aforesaid, which will deliver said groups to a continuously moving conveyor belt at regularly occurring intervals.

A further object of the invention is to provide a device, as aforesaid, in which the components of each cell group are delivered to said conveyor belt in a reasonably well formed stack.

A further object of the invention is to provide a device, as aforesaid, which will handle the components of said cell groups without damage thereto.

A further object of the invention is to provide a device, as aforesaid, which is relatively simple in both its original construction and in its subsequent maintenance, and which will be positive in its operation.

Other objects and purposes of this invention will become apparent to persons acquainted with this type of machinery upon reading the following specification and examining the accompanying drawings, in which:

Figure 1a is a side view of the continuous conveyor portion of the machine.

Figure 2a is a top view of the continuous conveyor portion of the machine.

Figure 12 is a top view of the working table of the machine.

Figure 13 is a sectional view substantially as taken along the line XIII—XIII of Figure 12.

In meeting the objects set forth hereinabove, I have provided a machine comprising a receiving surface upon which substantially rigid sheets, such as battery components or cell units thereof, are received from a conveyor, or other feeding device. Driving elements are provided on said machine for moving one battery component, here a negative plate from other than said conveyor onto said receiving surface prior to the reception of components thereon from said conveyor. Other members then cooperate with said conveyor for removing components from said conveyor onto said receiving surface to form a stack thereon with said plate as the bottom element. Means are provided which become actuated when a preselectable number of cell units are received from said conveyor into said stack for removing said stack away from said receiving surface and at the same time moving another plate onto the receiving surface in the position just vacated by the stack. My machine also includes means for receiving the stacks as they are displaced from said receiving surface and conveying them to another location.

Construction

Figure 1:
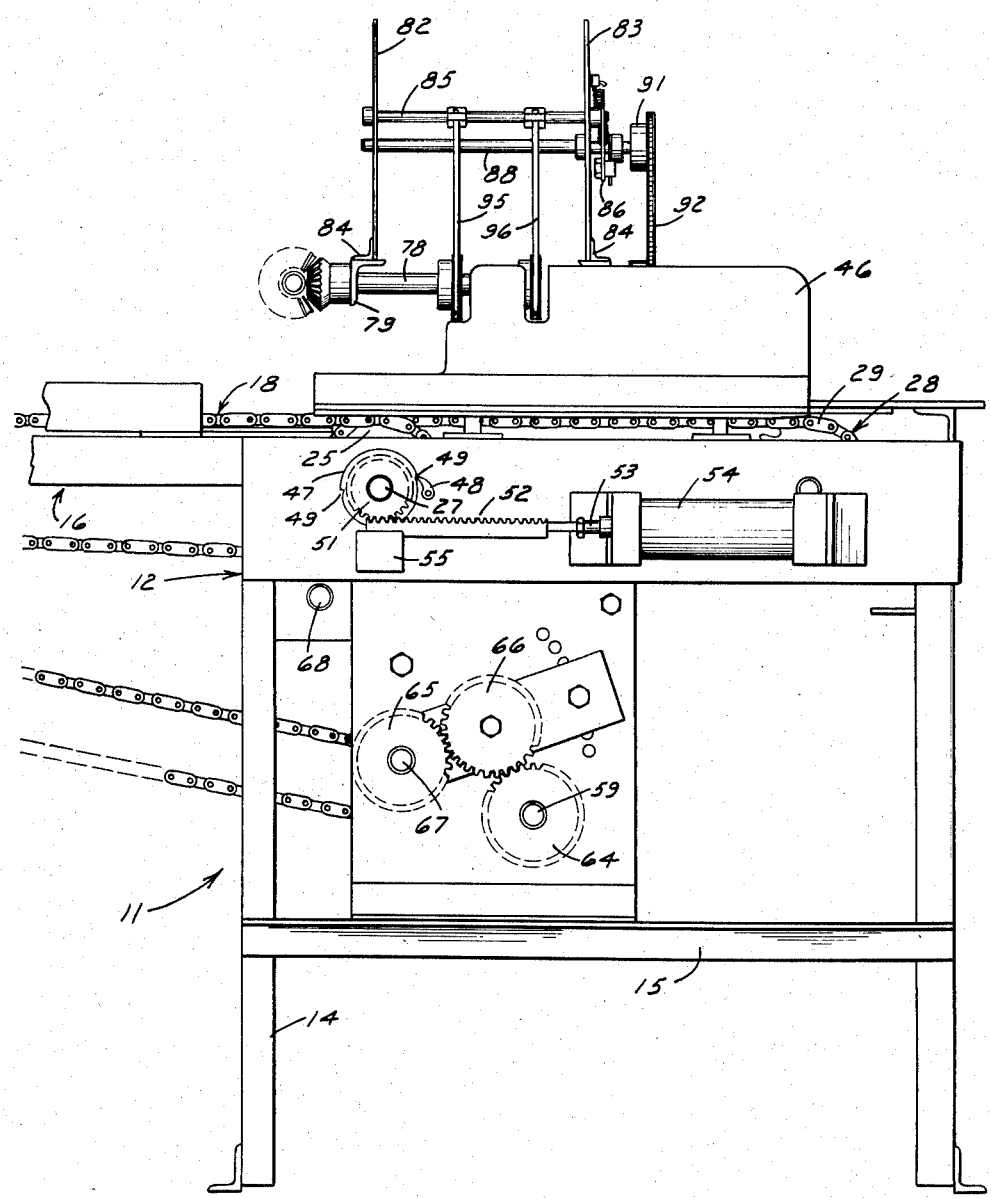
Figure 1 is a side elevation view of my battery plate selecting and stacking machine and includes an end portion of a feeding conveyor from which the cell units may be received by my machine.
Figure 2:
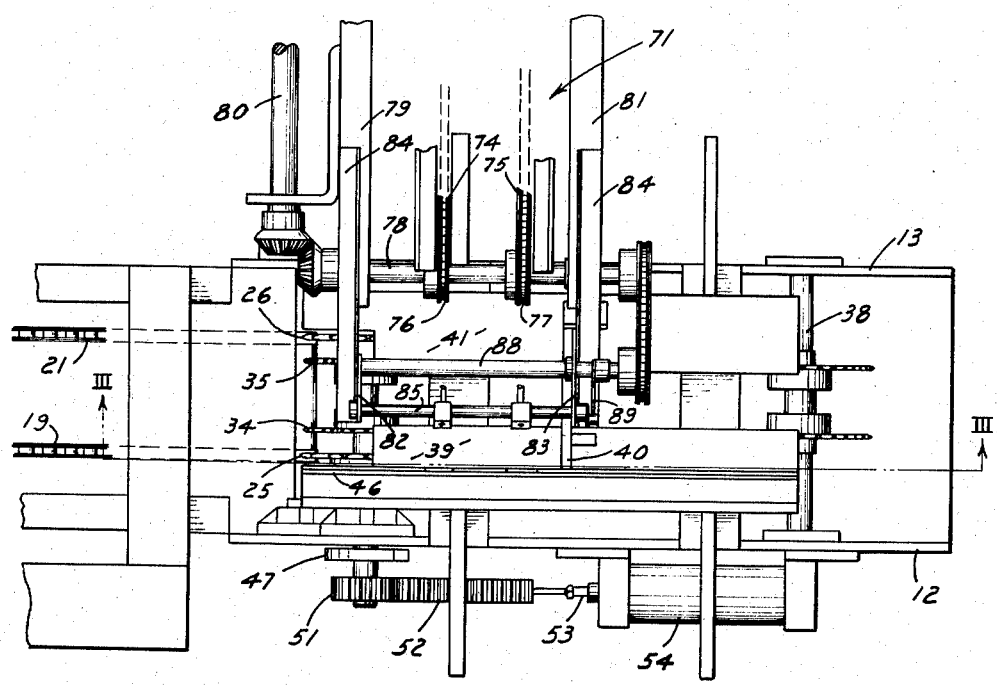
Figure 2 is a top plan view of said selector and includes said end portion of said feeding conveyor.
Figure 5:
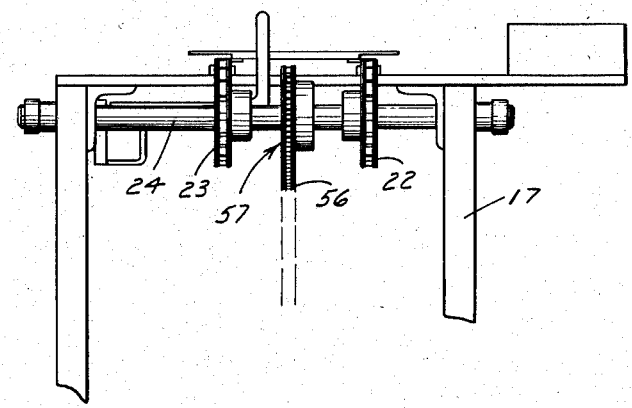
Figure 5 is an end view of my machine substantially as appearing from the leftward end thereof as shown in Figure 1.
Figure 6:
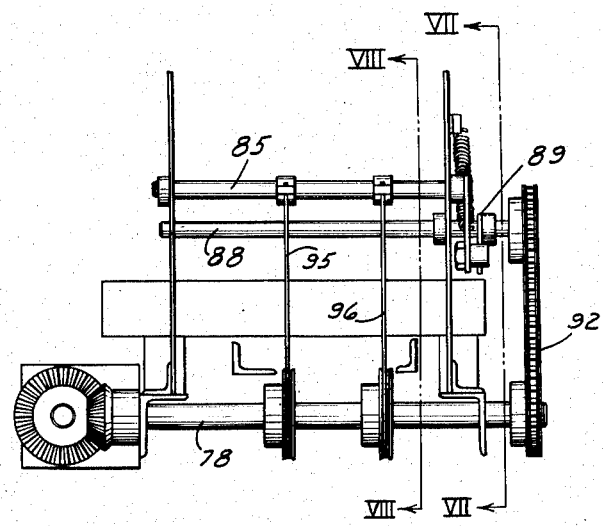
Figure 6 is a fragment on an enlarged scale of the view of my machine shown in Figure 3.

As shown generally in Figures 1 and 2, my selecting and stacking machine is comprised of a drive housing 11 having spaced, substantially parallel, side sheets 12 and 13 mounted upon stuctural members including the legs 14 and cross bars 15. A conveyor boom 16 is secured to and extends horizontally away from said housing 11 substantially parallel with the upper surface thereof and substantially between the planes defined by the side sheets 12 and 13. The outer end of the boom 16 is supported in a conventional manner by the legs 17 (Figure 1a). A conveyor 18 of any convenient, conventional type extends from the outer end of the boom 16 to the adjacent end of the housing 11. As shown herein for convenience, the conveyor 18 is comprised of a pair of endless chains 19 and 21 whose upper courses are substantially parallel and coplanar with the upper surface of the conveyor boom 16. Said chains are supported at the outer end of said boom upon the outer sprockets 22 and 23 (Figure 5) which are mounted upon the outer shaft 24, which is supported in turn upon said boom 16. Said chains 19 and 21 are also supported by the inner sprockets 25 and 26 mounted upon the inner shaft 27 (Figures 2 and 12) which in turn is rotatably supported upon the side sheets 12 and 13. The sprockets 25 and 26 are free floating on the shaft 27, and the chains 19 and 21 are arranged for continuous, identical movement.

Figure 14:
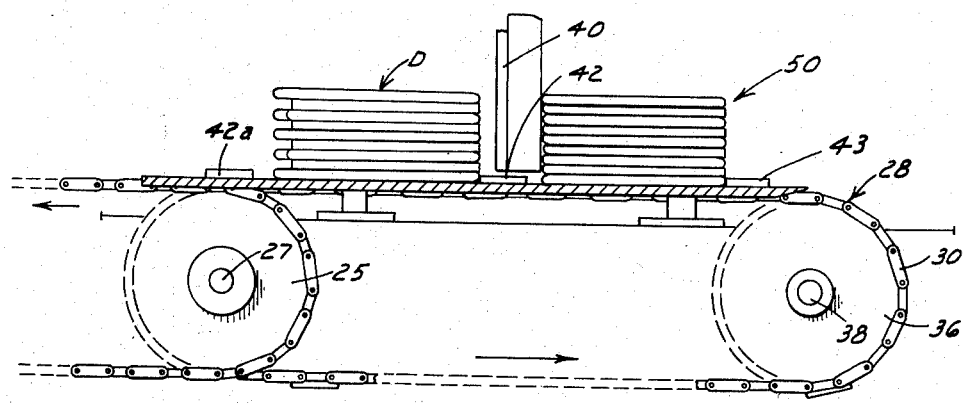
Figure 14 is a sectional view taken along the line XIV—XIV of Figure 12.
Figure 3:
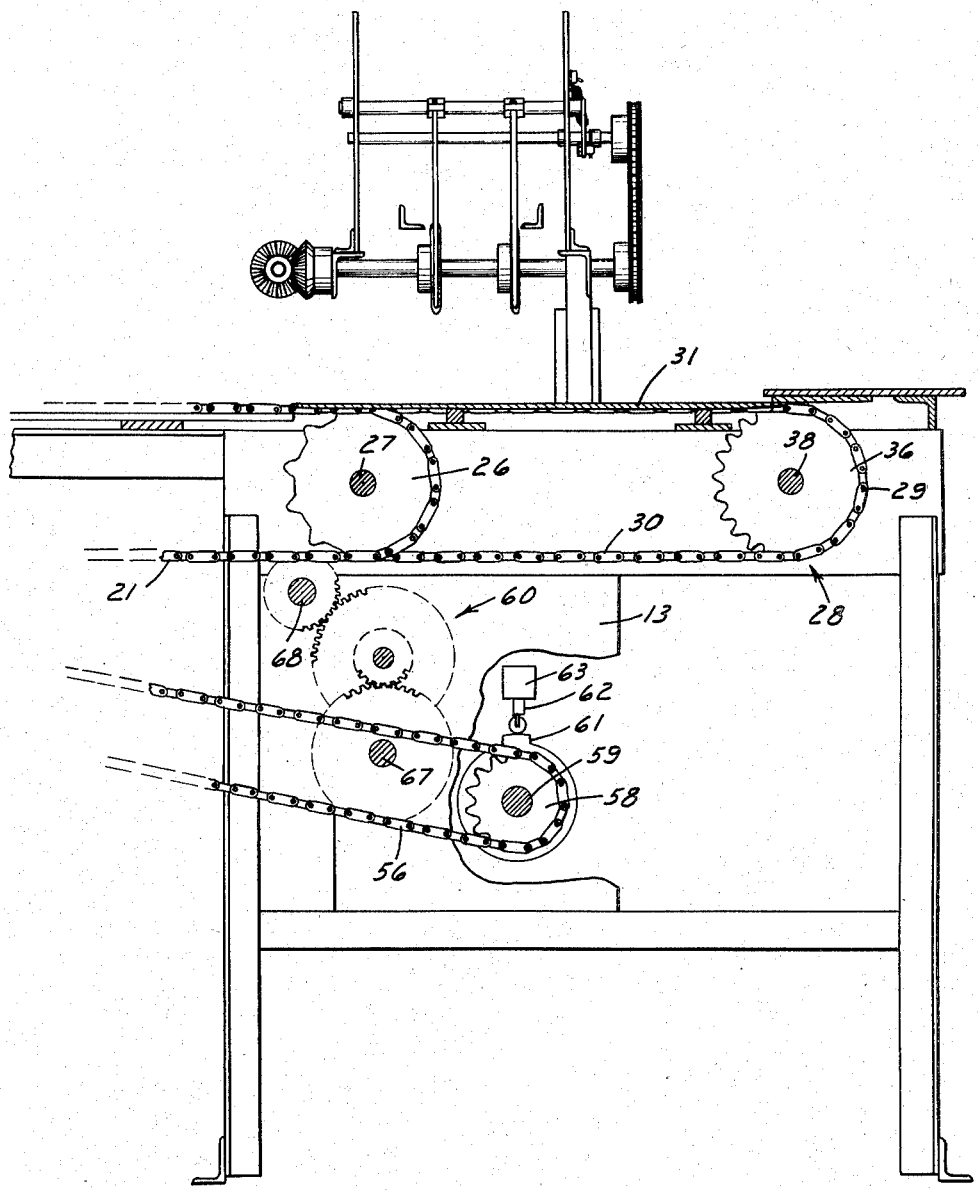
Figure 3 is a sectional view substantially as taken along the line III—III of Figure 2.

As shown in Figures 12, 13 and 14 an intermittently actuated conveyor 28 (Figure 1), comprised in this embodiment of the endless chains 29 and 30 (Figure 12), is mounted upon the housing 11 between the side sheets 12 and 13. The spaced parallel, upper courses of said chains 29 and 30 are substantially coplanar with the receiving or upper surface 31 of the drive housing 11. Said courses are supported at one pair of their mutually adjacent ends upon the front sprockets 34 and 35 secured upon the shaft 27, said sprockets being of substantially the same diameter as the inner sprockets 25 and 26. Accordingly, the upper courses are in substantially the same plane as, and adjacent to, the upper courses of the chains 19 and 21, for reasons appearing hereinafter. The other ends of the chains 29 and 30 are supported upon the rear sprockets 36 and 37 (Figure 4) which in turn are rotatably supported upon the rear shaft 38 (Figure 3) mounted between and upon the side sheets 12 and 13.

The upper surface 31 of said drive housing 11 includes a pair of spaced, coplanar, parallel guide strips 39 and 41 mounted upon the upper edges of the side sheets 12 and 13, respectively, and extending inwardly therefrom toward each other, so as to overlap the said upper courses of the chains 29 and 30, respectively, adjacent thereto. A plurality of driving elements, as the elements 42 and 43 (Figures 12, 13 and 14), are disposed upon and extend transverse of said guide strips 39 and 41 in parallel and spaced relationship with respect to each other. Each said driving element is secured, as by means of the brackets 44 and 45 (Figure 13) to said chains 29 and 30 of the intermittent conveyor 28. A vertical guide sheet 46 (Figures 1, 4 and 11) is mounted upon, and extends upwardly from, the guide strip 39 substantially parallel with and above the side sheet 12.

A ratchet wheel 47 (Figure 1) is secured upon the shaft 27 adjacent to and externally of the side sheet 12. A pawl 48 is mounted upon said side sheet 12 for engagement with the two diametrically opposed teeth 49 on said ratchet wheel 47. A ratchet gear 51 is rotatably supported upon the shaft 27 adjacent to and externally of the ratchet wheel 47. Conventional internal ratchet means, not shown, is mounted upon said shaft 27 within the ratchet gear 51 for effecting driving rotation of the shaft 27 when said gear 51 is rotated in counterclockwise direction, as appearing in Figure 1. A rack 52 engages the ratchet gear 51 effecting rotation thereof. Said rack is secured at one end thereof to the piston rod 53 of an air cylinder 54, or other similar actuating means. As disclosed herein, leftward movement of the rack 52, as appearing in Figure 1, effects a rotation of the ratchet gear 51 but does not effect a rotation of the shaft 27, upon which it is mounted. However, movement of the rack 52 rightwardly effects a rotation of the gear 51 and the shaft 27. The rack 52 may be held against the ratchet gear 51 by means of the support bracket 55 secured to the side sheet 12. The ratchet wheel 47 and pawl 48 positively prevent rotation of the shaft 27 when the rack 52 moves leftwardly.

The shaft 24 (Figures 1a and 5) at the outer end of the boom 16 is rotated by means of an endless drive chain 56 operating through a driven sprocket 57 mounted upon said shaft 24. Said chain 56 extends around a drive sprocket 58 (Figures 3 and 4) mounted upon and rotatable with a cam shaft 59 which is in turn rotatably supported upon and between the side sheets 12 and 13. That end of the shaft 59 extending through the side sheet 13 supports a single lobe timing cam 61 engageable by a cam follower 62 operating a limit switch 63 which controls the action of the air cylinder 54, hence the rack 52. Said limit switch 63 is mounted upon the side sheet 13.

The end of the shaft 59 (Figures 1 and 4) extending through the side sheet 12 supports a driven gear 64 which is driven by a drive gear 65 operating through the idling gear 66. Gear 65 is mounted upon and rotatable with a shaft 67 supported upon and between the side sheets 12 and 13, said shaft 67 being driven through a gear train 60 within the drive housing 11 by the drive shaft 68. Said drive shaft 68 is driven through any conventional means and in a conventional manner, as by the motor 69 supported fixedly with respect to the drive housing 11 (shown in Figure 4 only).

Figure 4:
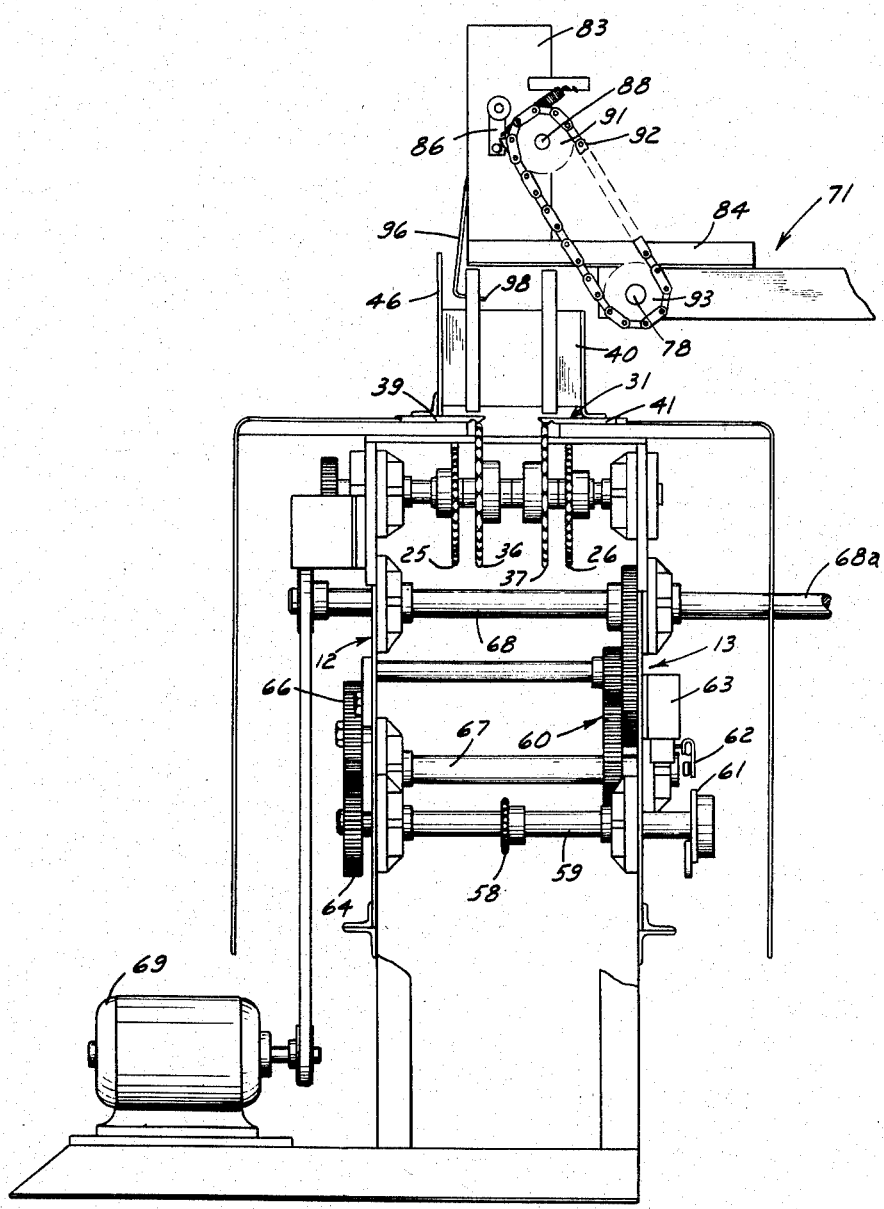
Figure 4 is an end view as taken from the right of Figure 1 with the conveyor chains removed to better show the sprockets.
Figure 7:
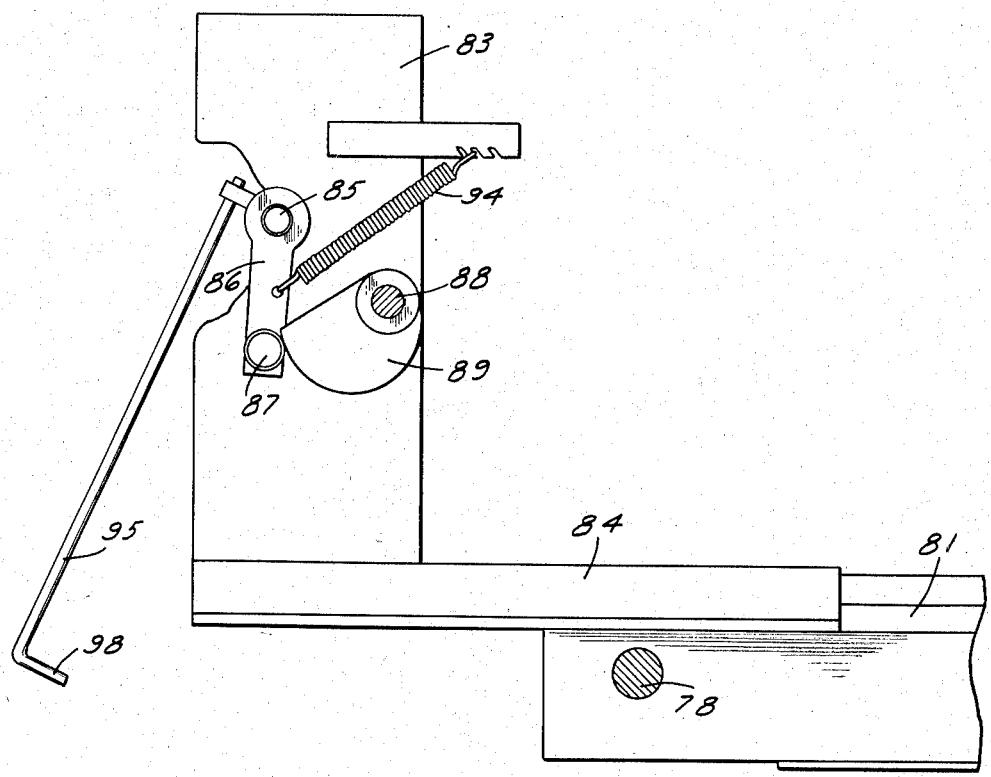
Figure 7 is a sectional view taken on line VII—VII of Figure 6.
Figure 8:
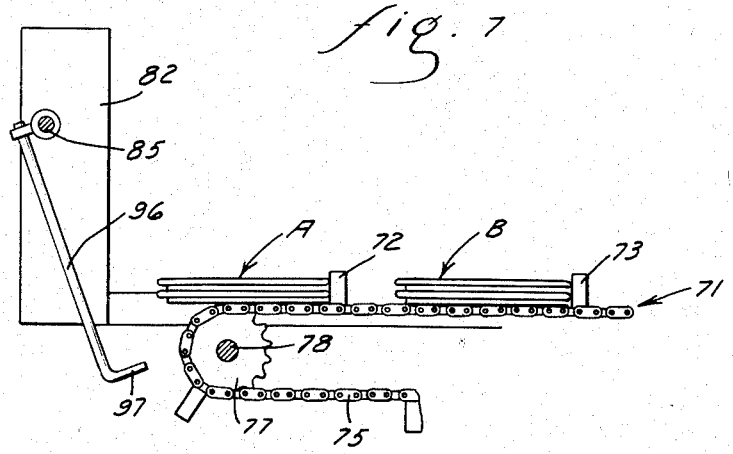
Figure 8 is a somewhat schematic sectional view substantially as taken along the line VIII—VIII of Figure 6 but with the side rail of the conveyor removed to show the chain and showing one operational position of the device.
Figure 9:
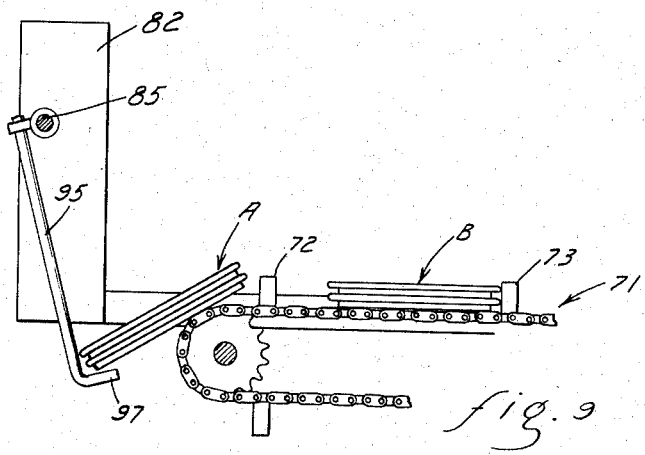
Figure 9 is a somewhat schematic sectional view similar to Figure 8 and showing another operational position of the device.
Figure 10:
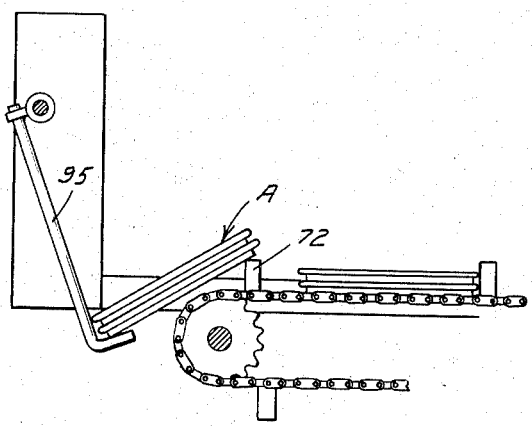
Figure 10 is a somewhat schematic sectional view similar to Figure 8 and showing still another operational position of the device.
Figure 11:
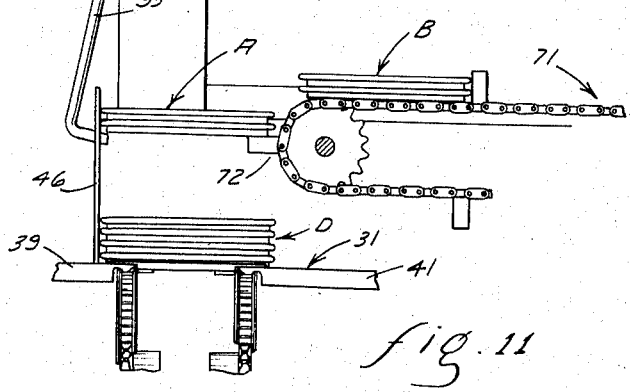
Figure 11 is a somewhat schematic sectional view similar to Figure 8 but including an additional fragment of said machine and showing a still further operational position of the device.

As shown in Figures 3 and 6 through 11, inclusive, my machine is designed to operate in conjunction with some type of feeding mechanism, such as the feeding conveyor 71, by which the cell units are supplied at exactly predetermined intervals and under a positive impelling. Such conveyor 71 is modified and provided with driving elements such as the lugs 72 and 73 (Figure 9). In this particular embodiment, the conveyor 71 is comprised of a pair of endless chains 74 and 75 (Figure 2) having substantially parallel and horizontal upper courses, said lugs being secured to and extending outwardly from the chains of said conveyor 71 at spaced intervals therealong. The chains 74 and 75 are supported upon the sprockets 76 and 77 mounted upon the shaft 78 which, as shown in Figures 4 and 11, is disposed parallel with and somewhat above the upper surface of the drive housing 11 and substantially adjacent to one side thereof. In this particular embodiment, the upper courses of the conveyor 71 are disposed substantially perpendicular to the plane of the side sheet 13.

The shaft 78 may be mounted in any convenient manner, as upon and between the bars 79 and 81 along the outsides of the conveyor 71 and substantially parallel therewith. A pair of vertical, parallel, spaced support plates 82 and 83 (Figures 1 and 2) are mounted, as by means of the brackets 84, upon the ends of the support bars 79 and 81 adjacent to the drive housing 11. Said support plates 82 and 83 define vertical planes substantially perpendicular to the side plates 12 and 13 and are disposed directly above the space between the guide strips 39 and 41.

A support rod 85 (Figure 1) is rotatably supported between and upon the support plates 82 and 83 near the upper ends thereof. That end of the rod 85 extending through the plate 83 supports an actuating arm 86 (Figures 1 and 7) having a cam roller 87 rotatably supported on the outer end thereof about an axis parallel with the axis of the rod 85. An actuating shaft 88 is rotatably supported upon and between the support plates 82 and 83 parallel with, slightly below, and to one side of said rod 85. A cam 89 is supported upon that end of the actuating shaft 88 adjacent to the cam roller 87 for engagement with said cam roller. A sprocket 91 (Figure 4) is mounted upon the actuating shaft 88 adjacent to the cam 89 for engagement by a chain drive 92 which also engages a sprocket 93 mounted upon the shaft 78. Thus, movement of the feeding conveyor 71, acting through the sprockets 91 and 93 and the chain drive 92, effects a corresponding rotation of the actuating shaft 88. As shown in Figure 7, resilient means, such as the spring 94, may be provided to hold the cam roller 87 against the cam 89.

A pair of elongated arms or engaging members 95 and 96 (Figures 1 and 7) are secured at the upper end of each to the rod 85 intermediate the support plates 82 and 83. The arms 95 and 96 are preferably substantially parallel and co-extensive from the said rod 85. The extended, lower ends of said arms are provided with hook portions 97 and 98 (Figures 7 and 8), respectively, which, when the arms 95 and 96 depend from the rod 85, extend at approximately ninety degree angles therefrom toward the adjacent end of the conveyor 71. Said arms 95 and 96 are preferably of such length that said hook portions when disposed adjacent to said conveyor 71 are substantially in the horizontal plane through the axis of shaft 78. The feeding conveyor 71, hence the actuating shaft 88 driven thereby, may be driven from independent, synchronized means or by the motor 69 through conventional synchronized means connecting the extension 68a (Figure 4) of the drive shaft 68 to the intermediate shaft 80, such means not being further disclosed herein. However, it is essential that the driving of the actuating shaft 88 be properly and positively timed with the movement of the intermittent conveyor 28 for reasons appearing fully hereinafter.

The vertical partition 40 (Figure 14), against which the pile 50 of extra plates is placed, is spaced from said surface 31 so as to permit only one plate at a time to pass therebeneath.

The feeding conveyor 71 may, if desired, be manually loaded or it may comprise the delivery end of a battery plate stacking machine as described and disclosed in my co-pending application Serial No. 380,006. It will be recognized that certain parts described herein, such as the chain drives 56 and 92, and the gear end shaft arrangements described in detail hereinabove, may be replaced with equivalent mechanisms as desired or required without departing from the scope of this invention.

*Operation*

The operation of my above described machine commences with the starting of the motor 69 (Figure 4) which, operating through the drive shaft 68, drives the shafts 59 and 68 by means of the gears associated therewith. Thus, the timing cam 61 on the shaft 59 is immediately rotated and placed in operation to effect actuation of the limit switch 63 at appropriate, preselectable intervals. Simultaneously, said shaft 59, operating through the chain drive 56 (Figure 1a), drives the shaft 24 at the outer end of the conveyor boom 16, thereby causing the upper course of the continuous conveyor 18 to begin a steady continuous movement from the inner end of the boom toward the outer end thereof.

While the cam follower 62 (Figures 3 and 4) is riding on the low dwell of the timing cam 61, the piston rod 53 (Figure 1) mounting the rack 52 will be in its extended position with respect to the air cylinder 54. As the cam follower 62 rides up toward the high dwell on said timing cam 61 the air cylinder 54 will be actuated to retract the piston rod 53, hence moving the rack 52 and rotating the ratchet gear 51. Such rotation of the ratchet gear 51 will effect a rotation of the shaft 27 in a counterclockwise rotation (Figure 1), thereby causing the upper courses of the intermittent conveyor 28 to move in a leftward direction (Figure 14). Thus, the driving element 42 will be moved to a position shown at 42a, the driving element 43 will be moved to the position vacated by the driving element 42, and another driving element will move into the position vacated by element 43. As the cam follower 62 drops back to its low dwell position, the air cylinder 54 will extend the piston rod 53 thereby causing the rack 52 to rotate the ratchet gear 51 in a clockwise direction (Figure 14). Since the ratchet gear 51 is free floating on the shaft 27 when rotated in said clockwise direction, such clockwise rotation of the ratchet gear 51 will not effect any movement of the intermittent conveyor 28. However, tendency for the conveyor 28 to be moved in a reverse direction in response to this return movement of the rack 52 will be prevented by the pawl 48 engaging one of the teeth 49 on said ratchet wheel 47, said ratchet wheel 47 being secured to said shaft 27.

Thus, it will be seen that the timing cam 61 operating through the limit switch 63, the air cylinder 54 and the ratchet gear 51 will effect a leftward (Figure 14) movement of the upper courses of the reciprocable conveyor 28 in a series of interrupted movements.

The feeding conveyor 71 is started simultaneously with the starting of the machine, or it may be independently started from another source, if desired, and then synchronized with the machine 11. Cell units are supplied to the feeding conveyor 71 from a suitable stacking machine, such as that shown in my application Serial No. 380,006 or by hand. Preferably, in the present embodiment of the machine, the components thereof are arranged as shown in Figure 8, namely, a separator on the bottom, then a positive plate, another separator and a negative plate on top.

A negative plate is, in the first operation, placed by hand on the stacking area C (Figure 12) of the receiving surface 31 located at the leftward end of the conveyor 28 (Figure 14) and to the left of the partition 40. In subsequent operations, this will be done automatically.

A stack of negative plates is placed adjacent the rightward side of the partition 40 (Figure 14) on the upper surface 31. The zone occupied by said stack 50 may be termed a "storage area."

As shown in Figures 8 through 11, inclusive, the lugs 72 and 73 on the parallel upper courses of the feeding conveyor 71 engage and urge successive cell units along the upper course of the feeding conveyor 71 (Figure 8). As a given cell unit "A" approaches the end of the conveyor 71 adjacent to the drive housing 11, the leading end of said cell unit will drop down (Figure 9) and rest upon the hook portions 97 and 98 of the engaging arms 95 and 96. By this time the cam roller 87 on the actuating arm 86 will be engaging the lower dwell of the cam 89. Thus, said cell unit will remain in said tilted position (Figure 9) until the lug urging that particular cell unit moves under the trailing end thereof (Figure 10). The cam roller 87 will then begin to ride up the sloping dwell on the cam 89 thereby causing the engaging arms 95 and 96 to rotate in a clockwise direction from the position shown in Figure 10 toward the position shown in Figure 11. The movement of the engaging arms 95 and 96 is caused to correspond by the shape of the cam 89 to the movement of the feeding conveyor 71 so that the pair of lugs 92 and 93 will move ahead sufficiently to receive said cell unit on their opposite, or trailing, edges and push the cell unit A forwardly to the guide sheet 46. Thus, the engaging arms 95 and 96 will continue to support said leading end of said cell unit and, in cooperation with the hooks 97 and 98, will do so in a horizontal position as shown in Figure 11. This position is located between the guide sheet 46 and the end of the conveyor 71. Immediately thereafter the engaging arms move leftwardly due to the action of the cam 89 and the lugs move downwardly and rightwardly due to the continuing, constant speed, movement of the conveyor 71. This permits the cell unit "A" to drop upon said negative plate previously placed on said stacking area C to form a stack D, which will normally constitute, when completed, one cell group. The cam 89 will then rotate to a position where the cam roller 87 will drop abruptly from its high dwell to its low dwell, thereby permitting the spring 94 to draw the actuating arm 86 hence the engaging arms 95 and 96 back to their initial positions. Such initial position of the engaging arms 95 and 96 will be as shown in Figure 8, where they are now ready to receive the cell unit "B" from the feeding conveyor 71.

Such depositing of the sheets from the feeding conveyor 71 onto the intermittent conveyor 28 will continue until, at a preselected time, the conveyor 28 is again actuated by the operation of the limit switch 63. Actuation of the intermittent conveyor 28 moves the pile of cell units from the stacking area "C" onto the continuous conveyor 18 and simultaneously moves the lowermost plate from the pile 50 thereof onto said stacking area for starting the next cell group. Such selection of one plate is effected by means of the partition 40 which extends into the path of the said plates 50 at the rightward end of the conveyor 28. This arrangement has been found effective to place a proper type of battery plate at the end of each cell group, without distrubing the cell units as they are delivered from the feeding conveyor 71.

The insertion of the extra plate from the pile 50, as shown in Figure 14, occurs at the beginning of each group and this, together with removal of a finished cell group, can be caused to occur at any desired interval by changing the timing cam 61 and thereby increasing the interval of actuation of the intermittent conveyor 28, with respect to the number of cell units desired in each cell group.

A limit switch actuator 99 may be placed at the outer end of the conveyor boom 16, as shown in Figures 1 and 2, in the path of the cell groups being moved along the continuous conveyor 18 for the purpose of automatically stopping the motor 69 in the event that the stacks of components are not removed from the continuous conveyor 18.

Thus, I have described the construction and operation of a machine for receiving battery cell units from a source, placing said cell units in neat, accurate stacks, or groups, of preselected size corresponding to a cell of a battery, moving each said group away from the receiving position on said machine and simultaneously moving an additional negative plate as normally required for a cell group into said receiving position as the bottom component of the next stack to be formed. Such operation, it will be observed, is entirely automatic.

Where relatively weak, or flimsy, separators are to be handled, as wet wooden ones, the cell units will be stacked on the feeding conveyor 71 with a negative plate as the bottom component. In such case, the supplying of the negative plate to the stacking area C is prevented by merely removing the supply stack 50, and without the necessity of other adjustments. The extra negative plate will now need to be supplied to the top of each cell group stack and, insofar as the present embodiment is concerned, will be done by hand.

While reference throughout has been made to battery cell units as illustrative of the primary use of the machine, it will be recognized that the machine is capable of stacking predetermined numbers of any type of reasonably stiff sheets, supplied either in groups or singly.

In some circumstances where it is desired to bring the chains 19 and 21 of the continuous conveyor closer together, it will be entirely feasible to mount the sprockets 25 and 26 between the sprockets 34 and 35 and adjust as desired, if at all, the spacings of these sprockets, and correspondingly adjust in an obvious manner the spacing of sprockets 36 and 37, of sprockets 22 and 23, and of other parts, if any, affected by this change.

I claim:

1. In a machine for selecting and stacking substantially rigid sheets, the combination comprising: a receiving surface; a feeding conveyor positioned above said surface and terminating at one end adjacent one edge of said surface, said conveyor being provided with lugs of substantial length; means effecting continuous movement of said conveyor; an engaging member supported for movement across said receiving surface toward and away from a point adjacent to the end of said conveyor; mechanism effecting such movement of said member so timed with the continuous movement of said conveyor that said member will be positioned adjacent said end of said conveyor for engaging the leading edge of a sheet urged toward said member by one of said lugs and holding said sheet in an inclined position and against further movement for a period of time sufficient to permit said lug to move under said sheet for engaging the trailing edge thereof and said member then moving away from said point a distance substantially equal to the dimension of said sheet in its direction of travel on said conveyor and there cooperating with said lug for holding said sheet in a horizontal position, said engaging member and said lug then moving apart substantially simultaneously to drop said sheet onto said surface.

2. Apparatus defined in claim 1 including also: means moving a sheet onto said surface at predetermined intervals with respect to the dropping of sheets by said member and lug.

3. Apparatus defined in claim 1 including: a pair of spaced driving elements, one normally located adjacent said receiving surface for selectively removing stacked sheets thereon and the other thereof being adjacent the base of a stack of sheets of which at least one is to be placed onto said surface at predetermined intervals with respect to the dropping of sheets by said member and lug, and means timed with respect to the operation of said conveyor for simultaneously moving said elements, whereby a stack formed on said surface is moved off said surface and the bottommost of the units in said supply stack is moved onto said surface.

4. In a machine for selecting and stacking cell units for a storage battery into cell groups therefor, the combination comprising: means providing a first horizontal surface constituting a stacking area; means providing an adjacent and coplanar second horizontal surface constituting a storage area for holding a stack of negative plates; a feeding conveyor spaced above and terminating near one edge of said stacking area; a first transfer device for moving one, and only one, negative plate at a time from said storage area to said stacking area; a second transfer device for successively receiving cell units from said conveyor and placing them in a single stack on said stacking area; a third transfer device for moving a completed stack off said stacking area; means actuating said first and third transfer devices after a predetermined number of operations of said second transfer device.

5. In a machine for selecting and stacking cell units for a storage battery into cell groups therefor, the combination comprising: means providing a first horizontal surface constituting a stacking area; means providing an adjacent and coplanar second horizontal surface constituting a storage area for holding a stack of negative plates; a partition between said areas spaced from the surface thereof a distance greater than the thickness of one of said plates but less than the thickness of two of said plates; a continuously moving feeding conveyor spaced above and terminating near one edge of said stacking area; a first transfer device for engaging the bottommost plate of said stack of negative plates and moving it under said partition from said storage area to said stacking area; a second transfer device for receiving cell units, one unit at a time, from said conveyor and placing them in a single stack on said negative plate on said stacking area; a third transfer device for moving a completed stack off said stacking area; means simultaneously actuating said first and third transfer devices after a predetermined number of operations of said second transfer device.

References Cited in the file of this patent

UNITED STATES PATENTS

| | | |
|---|---|---|
| 1,365,741 | Speer | Jan. 18, 1921 |
| 1,600,958 | Hart et al. | Sept. 21, 1926 |
| 1,915,376 | Moone | June 27, 1933 |
| 2,560,252 | Schefe | July 10, 1951 |
| 2,605,910 | Kovatch | Aug. 5, 1952 |
| 2,626,038 | Smith | Jan. 20, 1953 |
| 2,639,049 | Kinzelman et al. | May 19, 1953 |
| 2,680,510 | Donath | June 8, 1954 |
| 2,704,593 | Galloway | Mar. 22, 1955 |